(12) United States Patent
Chen et al.

(10) Patent No.: US 8,886,747 B1
(45) Date of Patent: Nov. 11, 2014

(54) VERIFYING DOMAIN OWNERSHIP

(75) Inventors: Bryan Chen, Los Angeles, CA (US); Erik M. Kline, Tokyo (JP); Marija Mikic-Rakic, Manhattan Beach, CA (US)

(73) Assignee: Google Inc., Mountain View, CA (US)

( * ) Notice: Subject to any disclaimer, the term of this patent is extended or adjusted under 35 U.S.C. 154(b) by 699 days.

(21) Appl. No.: 12/882,596

(22) Filed: Sep. 15, 2010

Related U.S. Application Data

(60) Provisional application No. 61/285,522, filed on Dec. 10, 2009.

(51) Int. Cl.
*G06F 15/173* (2006.01)

(52) U.S. Cl.
USPC .............................. 709/217; 709/224; 726/5

(58) Field of Classification Search
CPC ...................................... G06F 15/173
USPC ....................... 709/219, 224; 726/5
See application file for complete search history.

(56) References Cited

U.S. PATENT DOCUMENTS

| | | | |
|---|---|---|---|
| 7,996,512 B2* | 8/2011 | Adelman et al. | 709/223 |
| 8,443,087 B2* | 5/2013 | Kamboh et al. | 709/227 |
| 2006/0088026 A1* | 4/2006 | Mazur et al. | 370/352 |
| 2009/0119402 A1* | 5/2009 | Shull et al. | 709/224 |
| 2010/0138907 A1* | 6/2010 | Grajek et al. | 726/10 |

* cited by examiner

*Primary Examiner* — David Lazaro
*Assistant Examiner* — Marie Georges Henry
(74) *Attorney, Agent, or Firm* — Fish & Richardson P.C.

(57) ABSTRACT

Systems and processes are provided for verifying ownership of a network identifier or domain name. A content provider can verify that a first entity owns the network identifier by instructing the first entity to modify data associated with the network identifier in a defined manner. The content provider can verify that the first entity owns the network identifier by confirming that the data associated with the network identifier has been modified in the defined manner.

13 Claims, 4 Drawing Sheets

200

202 — Domain name: [_____]

204 — Language: [Select a language ▼] — 206

208 — Preferred format: [none ▼] — 210

212 — Keywords: [_____]
(separate by commas)

[Submit] — 214

Request Confirmation

Thank you for submitting your request to receive content for your domain. Please create the following CNAME record for your domain using your domain registrar. — 302

| Record Type | Value / Destination |
|---|---|
| CNAME | 1234-ABC.exampledomain.com |

— 304

Click here for step-by-step instructions on how to set your CNAME.

FIG. 3

VERIFYING DOMAIN OWNERSHIP

CROSS-REFERENCE TO RELATED APPLICATION

This application claims priority to U.S. Application No. 61/285,522, filed on Dec. 10, 2009 and titled "VERIFYING DOMAIN OWNERSHIP."

BACKGROUND

This disclosure relates to verifying ownership of a network domain identifier.

In many different environments, content providers want to distribute content to selected recipients. For example, advertisers want to distribute their advertisements to advertisement slots where the advertisements will be effective in communicating information to potential customers, and when the advertisements will lead to desired activity, such as a purchase of the advertiser's goods or services. In some instances, a content provider may rely on contextual information when making decisions regarding content distribution slot selections. For example, an advertiser may want to advertise goods and/or services relating to travel in travel magazines, on travel web sites, or during travel television programs.

Typically, owners of the content distribution slots, which may be referred to as publishers, are compensated for providing the slots. For example, a publisher may be compensated by an advertisement distributor who provides advertisements that are displayed in the publisher's advertisement distribution slots.

SUMMARY

Ownership of content distribution slots may need to be determined. For example, an advertising content provider that provides advertisements in response to a request for content associated with a first web site may need to determine who owns the first web site in order to make payments to the owner of the first web site when the first web site is used to display the advertisements provided by the advertising content provider.

In one general aspect, computer-implemented method for verifying domain name ownership includes receiving an indication that a first entity owns a first domain name and using at least one processor to instruct the first entity to modify data associated with the first domain name in a defined manner. The method further includes receiving a request for content associated with the first domain name after instructing the first entity to modify data associated with the first domain name, and verifying, using at least one processor, that the first entity owns the first domain name by confirming that the data associated with the first domain name has been modified in the defined manner.

Implementations may include one or more of the following features. For example, content may be provided in response to the request for content only upon verifying that the entity owns the first domain name. Payment may be provided to the first entity upon verifying that the first entity owns the first domain name and providing content in response to the request for content. The provided content may be advertising content.

Instructing the first entity to modify data associated with the first domain name in a defined manner may include instructing the first entity to include a unique identifier in the data associated with the first domain name, and verifying that the first entity owns the first domain name may include confirming that the unique identifier is included in the data associated with the first domain name. For example, instructing the first entity to modify data associated with the first domain name in a defined manner may include instructing the first entity to include the unique identifier in the CNAME associated with the first domain name.

In another general aspect, a computer storage medium is encoded with a computer program that includes instructions that when executed by data processing apparatus cause the data processing apparatus to perform operations. These operations include receiving an indication that a first entity owns a first domain name and instructing the first entity to modify data associated with the first domain name in a defined manner. The operations also include receiving a request for content associated with the first domain name after instructing the first entity to modify data associated with the first domain name, and verifying that the first entity owns the first domain name by confirming that the data associated with the first domain name has been modified in the defined manner.

Implementations may include one or more of the features noted above.

In another general aspect, a system includes a receiver that receives an indication that a first entity owns a first domain name and later receives a request for content associated with the first domain name. The system also includes at least one processor that instruct the first entity to modify data associated with the first domain name in a defined manner before the receiver receives a request for content associated with the first domain name, and verifies that the first entity owns the first domain name by confirming that the data associated with the first domain name has been modified in the defined manner.

Implementations can provide any, all or none of the following advantages. For example, correct ownership of a network identifier or domain name can be accurately verified, and targeted content can be provided in response to requests for content associated with a network identifier based on targeting information provided by the correct owner for the network identifier. In addition, payment for content providing services can be made to the correct owner of a network identifier or domain name.

The details of one or more implementations are set forth in the accompanying drawings and the description below. Other features will be apparent from the description and drawings, and from the claims.

DESCRIPTION OF DRAWINGS

FIG. 2 is a diagram of an example form for requesting content in association with a domain name.

FIG. 3 is a diagram of an example request confirmation for a request for content in association with a domain.

Like reference symbols in the various drawings indicate like elements.

DETAILED DESCRIPTION

Figure 1:
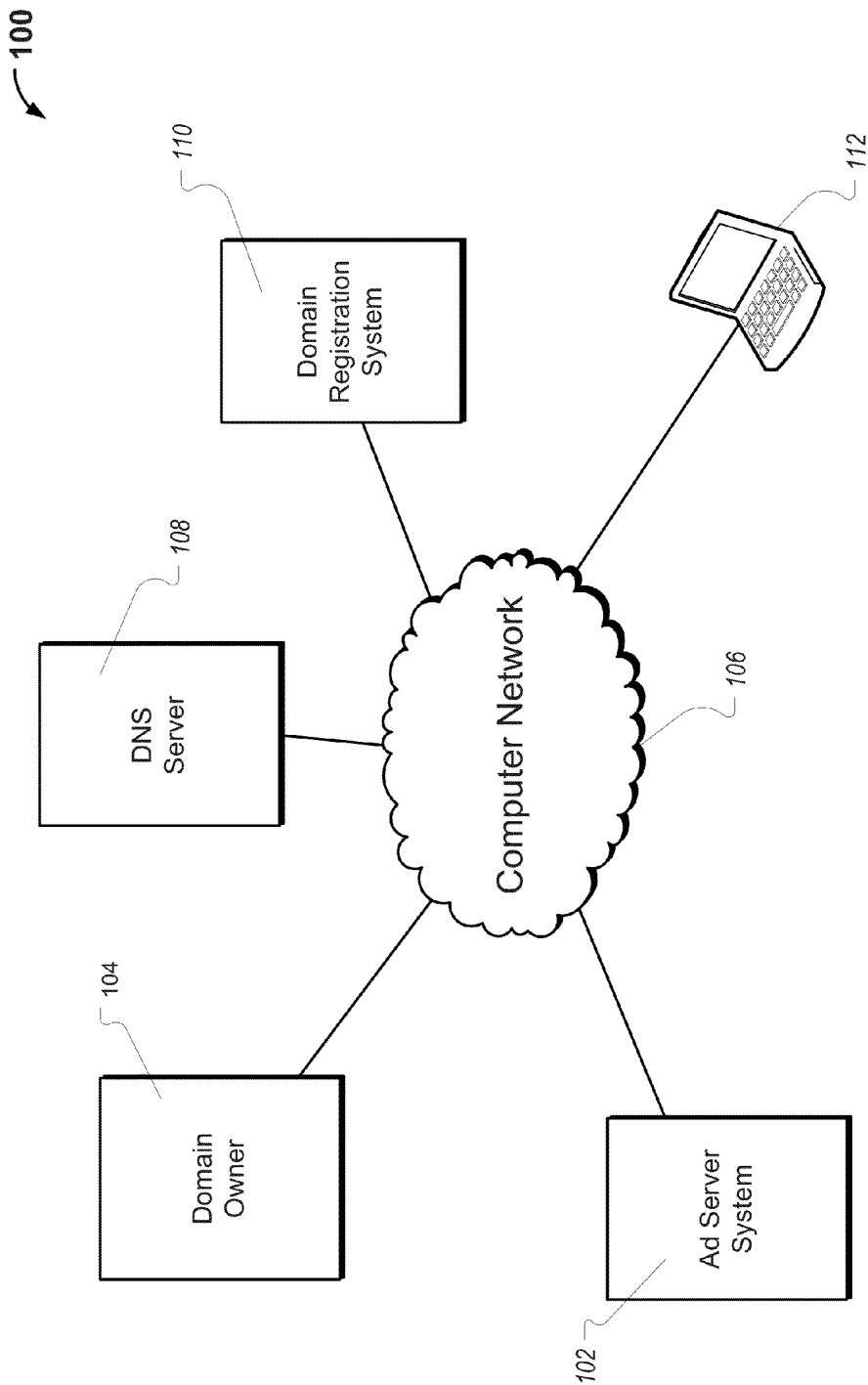
FIG. 1 is a block diagram illustrating a system for verifying ownership of a domain name.

Referring to FIG. 1, in a system 100, a domain owner 104 is associated with a registered domain name. For example, the domain owner 104 may have registered the domain "exampledomainname.org" and therefore may be the legal owner of the domain "exampledomainname.org." The domain owner 104 also may be associated with one or more other domains in addition to the registered domain. In addition, the registered domain may have been owned by a different domain owner at a previous time.

The domain owner 104 may contact an advertisement server system 102 in order to request that the advertisement server system 102 provide advertising content in response to requests for content for the registered domain. For example, the domain owner 104 can communicate with the advertisement server system 102 through a computer network 106 (e.g., the Internet, a LAN or a WAN). In this example, the domain owner 104 provides an indication of the registered domain to the advertisement server system 102. If the advertisement server system 102 agrees to the request from the domain owner 104, the advertisement server system 102 can provide advertising content in response to requests for content associated with the registered domain.

In some implementations, the domain owner 104 provides additional information to the advertisement server system 102 other than just an indication of the registered domain. For example, the domain owner 104 can indicate a desired language to associate with the registered domain. As another example, the domain owner 104 can indicate a desired advertisement content format, such as text based, image based, or video. As yet another example, the domain owner 104 can indicate a desired size for displayed advertisements. The domain owner 104 can indicate targeting information, such as keywords to be used to identify advertisements that are relevant to the registered domain. For example, the domain owner 104 can indicate keywords of "dining," "restaurant," "food," and "wine."

The advertisement server system 102 may provide a form that indicates information that can be provided by the domain owner 104. For example, the form can be a web page with fields that can be populated by the domain owner 104. The domain owner 104 can make a request for advertising content to be provided in association with the registered domain by submitting the form to the advertisement server system 102.

The advertising content provided by the advertisement server system 102 may be displayed alongside content of a web page associated with the registered domain. In such instances, the provided advertisements may be selected so as to be relevant to content displayed by the web page. For example, if the registered domain is associated with a web page that contains an article about hunting, the advertisement server system 102 may supply advertisements for hunting gear, hunting related media, or hunting related items.

In some cases, the registered domain may be associated with little or no content. For example, the registered domain may be a "parked domain" that is not associated with any web content. In this example, when a request for content associated with the registered domain is made, the request can be routed to the advertisement server system 102, which may respond to the request by providing a web page that includes advertising content and little or no other content. For example, the web page provided by the advertisement server system 102 can include a header and several advertisements but no other content.

In some instances, the advertisement server system 102 verifies that the domain owner 104 is the actual owner of the registered domain. For example, the domain owner 104 may submit a request for the advertisement server system 102 to provide advertising content in association with the registered domain. In this example, the domain owner 104 can indicate the registered domain in the request. However, that the domain owner 104 indicated the registered domain in the request does not mean that the domain owner 104 is the actual legal owner of the registered domain.

It may be necessary for the advertisement server system 102 to verify that the domain owner 104 is the actual owner of the registered domain to ensure that targeting and/or desired language information provided by the domain owner 104 should be used in association with the registered domain. For example, if the domain owner 104 indicates that keywords of "ski" and "snowboard" should be associated with a domain of "exampleskisite.org," the advertisement server system 102 may need to verify that the domain owner 104 is the actual owner of the domain "exampleskisite.org" before using the provided keywords to provide advertising content that relates to skiing and snowboarding in response to requests for content associated with the domain "exampleskisite.org." In some implementations, it may be necessary for the advertisement server system 102 to verify that the domain owner 104 is the actual owner of the registered domain to ensure that the proper owner of the registered domain is paid for advertisements that are displayed in association with the registered domain.

As part of the process of verifying ownership of the domain name, the advertisement server system 102 generates or identifies a unique identifier. For example, the advertisement server system 102 can generate a unique identifier using a random character generator. As another example, the advertisement server system 102 can identify a unique identifier from a list of unique identifiers.

In some implementations, the advertisement server system 102 associates the unique identifier with the registered domain. For example, the advertisement server system 102 may generate a unique identifier of "1234" and associate the unique identifier with the registered domain by storing the registered domain and the unique identifier together in a file, database, or lookup table.

In some implementations, the advertisement server system 102 associates the unique identifier with the domain owner 104. In such implementations, the unique identifier can be associated with multiple domains that are associated with the domain owner 104, rather than just the registered domain.

In some implementations, the advertisement server system 102 identifies or generates a non-unique identifier to associate with the registered domain or the domain owner 104. For example, the advertisement server system 102 may receive a large number of requests to provide advertising content in association with domains. The available pool of identifiers may be smaller than the number of domains for which the advertisement server system 102 provides advertising content. In such situations, the advertisement server system 102 can associate the same identifier with multiple domains or multiple domain owners.

The advertisement server system 102 may generate or identify a network ID for which the registered domain can be used as an alias. For example, the advertisement server system 102 may identify an IP address for which the registered domain can be used as an alias. The advertisement server system 102 also may generate or identify a network ID that includes the unique or non-unique identifier associated with the registered domain or domain owner 104. For example, if the identifier is "1111-XYZ," the advertisement server system 102 can generate a URL of "1111-XYZ.adserving.exampleadserver.net" for which the registered domain can be used as an alias. As another example, the advertisement server system 102 can generate a URL of "alias.<identifier>.adserving.exampleadserver.net," where <identifier> is the unique or non-unique identifier associated with the registered domain or domain owner 104.

In some implementations, a portion of the network ID generated or identified by the advertisement server system 102 is the same for multiple domains for which the advertisement server system 102 has received a request to provide advertising content. Following the above example, "adserving.exampleadserver.net" can be used as a portion of all network IDs provided in association with multiple domains. In some implementations, using the same higher level domain names in the network IDs provided in association with multiple domains can ensure that all of the requests for content associated with the multiple domains are routed to the same internal server of the advertisement server system 102. In some implementations, a portion of the network ID is the same for all domains for which the advertisement server system 102 has received a request to provide advertising content.

The advertisement server system 102 can provide the network ID to the domain owner 104 and instruct the domain owner 104 to set the registered domain as an alias for the provided network ID. For example, the domain owner 104 can set the network ID as a canonical name, or CNAME, for the registered domain.

Following this example, the domain owner 104 can set the network ID as a CNAME for the registered domain by sending a request to a DNS server 108 indicating that the network ID is to be set as a CNAME for the registered domain. For example, the domain owner 104 can send the request to the DNS server 108 through the computer network 106. In some implementations, the domain owner 104 may have registered the registered domain using a domain registration facilitation system 110. In such implementations, the domain registration facilitation system 110 may allow the domain owner 104 to indicate a CNAME for the registered domain. For example, the domain registration facilitation system 110 may provide a web page that includes fields that can be populated by the domain owner 104. In this example, the domain owner 104 can access the web page by logging in using a user name and password. The web page can include a field that allows the domain owner 104 to indicate a CNAME for the registered domain.

Still referring to FIG. 1, the advertisement server system 102 can verify that the network ID has been set as the CNAME for the registered domain. For example, the advertisement server system 102 performs a DNS lookup by providing the registered domain to the DNS server 108. The DNS server can then indicate the CNAME for the registered domain. If the CNAME indicated by the DNS server is the same as the network ID provided by the advertisement server system 102 to the domain owner 104 in association with the registered domain, the advertisement server system 102 can verify that the domain owner 104 is the actual owner of the registered domain. In this example, if the CNAME indicated by the DNS server is not the same as the network ID, the advertisement server system 102 can determine that the domain owner 104 is not the actual owner of the registered domain. In some implementations, if the advertisement server system 102 determines that the domain owner 104 is not the actual owner of the registered domain, the advertisement server system 102 will not provide advertising content in response to requests for content associated with the registered domain.

In some implementations, rather than determining if the CNAME for the registered domain is the same as the network ID, the advertisement server system 102 can verify that the unique or non-unique identifier associated with the registered domain or the domain owner 104 is included in the CNAME. In such implementations, rather than generating the network ID and providing the network ID to the user, the advertisement server system 102 can indicate the identifier to the domain owner 104 and instruct the domain owner 104 to include the identifier in a CNAME for the registered domain. The advertisement server system 102 can then perform a lookup to determine if the CNAME for the registered domain includes the identifier, in which case the advertisement server system 102 can verify that the domain owner 104 is the actual owner of the registered domain. If the CNAME for the registered domain does not include the identifier, the advertisement server system 102 can determine that the domain owner 104 is not the actual owner of the registered domain.

In some implementations, the advertisement server system 102 performs a lookup to determine the CNAME for the registered domain a set time after indicating to the domain owner 104 to set the network ID as the CNAME for the registered domain. For example, the advertisement server system 102 can instruct the domain owner 104 to set "LMNOP.adversver.foo.com" as the CNAME for the registered domain within 24 hours. The advertisement server system 102 then waits 24 hours after instructing the domain owner 104 and performs a lookup to determine the CNAME for the registered domain. If the CNAME for the registered domain is "LMNOP.adversver.foo.com," the advertisement server system 102 can verify that the domain owner 104 is the actual owner of the registered domain.

In some implementations, the advertisement server system 102 performs periodic CNAME lookups for the registered domain. For example, the advertisement server system 102 can send a request for the CNAME of the registered domain to the DNS server 108 every hour. Upon receiving an indication of a CNAME that includes the identifier, or matches the network ID, the advertisement server system 102 verifies that the domain owner 104 is the actual owner of the registered domain and stops performing periodic CNAME lookups.

In some implementations, the advertisement server system 102 does not perform a CNAME lookup until the advertisement server system 102 has received a request to provide content in association with the registered domain. For example, a user of an end user system 112 can send a request for content associated with the registered domain by entering the registered domain into a navigation field of a web browser. The request can be routed to the DNS server 108 through the computer network 106. The DNS server 108 can resolve the registered domain (e.g., by identifying a CNAME for the registered domain, and rerouting the request to the identified CNAME). The request is eventually resolved to an IP address associated with the advertisement server system 102, either by the DNS server 108 or by another DNS server.

Continuing with this example, the end user system 112 issues an HTTP GET request for the registered domain name to the IP address associated with the advertisement server system 102. Upon receiving the request, the advertisement server system 102 can identify that the request is associated with the registered domain. The advertisement server system 102 can then perform a CNAME lookup to identify the CNAME of the registered domain. If the CNAME of the registered domain includes the identifier, or matches the provided network ID, the domain owner 104 can be verified as the actual owner of the registered domain and the advertisement server system 102 can provide advertising content to the end user system 112 in response to the request.

In some implementations, ownership of the registered domain is verified prior to a request for content associated with the registered domain being received. For example, the advertisement server system 102 verifies that the domain owner 104 is the actual owner of the registered domain using a periodic CNAME lookup method, or a time delayed CNAME lookup method as described above. The advertisement server system 102 then receives a request for content associated with the registered domain. For example, this may occur when the user uses the end user system 112 to send a request for content associated with the registered domain, the request is transmitted through the computer network 106 to the DNS server 108, and the DNS server 108 identifies the CNAME of the registered domain (which in this example is the network ID provided by the advertisement server system 102). In some instances, the DNS server 108 may route the request to another DNS server so that the CNAME can be resolved to an IP address. In other instances, the DNS server 108 can resolve the CNAME to an IP address. The end user system 112 can then issue an HTTP GET request for the registered domain name to the IP address.

The advertisement server system 102 receives the request and identifies the registered domain as being associated with the request. The advertisement server system 102 can determine if the domain owner 104 has been verified as the actual owner of the registered domain. For example, the advertisement server system 102 may access a database of verified domain owners and associated verified domains. Upon determining that the domain owner 104 has been verified as the actual owner of the registered domain, the advertisement server system 102 can provide advertising content to the end user system 112 through the computer network 106. In some implementations, the advertisement server system 102 provides the advertising content in the form of a web page that includes one or more advertisements.

The advertising content may be selected so as to be relevant to targeting information provided by the domain owner 104. For example, the domain owner 104 can indicate keywords of "sleep" and "bedding" as targeting information for the registered domain. The advertisement server system 102 can provide advertisements for blankets, pillows, and sheets in response to the request for content associated with the registered domain.

In some implementations, after advertising content has been provided in response to the request, the advertisement server system 102 provides payment to the domain owner 104. For example, the advertisement server system 102 may add money to an account associated with the domain owner 104 and provide payments from the account to the domain owner 104 on a periodic basis.

Referring now to FIG. 2, a form 200 may be used to allow a domain owner to request that content be provided in response to a request for content associated with a domain. For example, referring to FIG. 1, the advertisement server system 102 can provide the form 200 to the domain owner 104 in the form of a web page. The domain owner 104 can receive the form 200 from the advertisement server system 102 via the computer network 106. As another example, the form 200 can be a text document that is completed by a domain owner and submitted electronically (e.g., via e-mail) or a paper form that is completed by hand.

The form 200 includes a domain name field 202 that allows the domain owner to specify a domain for which content is to be provided. In some implementations, the domain owner can enter multiple domain names into the domain name field 202. For example, the domain owner can enter multiple domain names separated by commas or semi-colons. In other implementations, the domain owner may be able to attach a file that includes one or more domain names.

The form 200 also includes a language field 204 to allow the domain owner to specify a language to associate with the one or more domains specified in the domain name field 202. In some implementations, all content that is provided in association with the specified one or more domains is in the indicated language. In other implementations, a preference is given to content in the indicated language, but not all of the content provided in association with the specified one or more domains is in the indicated language.

The form 200 may allow the domain owner to use a drop down menu 206 to indicate a preferred language. In other implementations, the domain owner can enter the preferred language into a text field.

The form 200 also includes a preferred format field 208. This allows the domain owner to specify a preferred format for content provided in association with the specified one or more domains. For example, the form 200 can include a drop down menu 210 that allows the domain owner to choose from among several specified content formats. Specified content formats can include, for example, text-based, image-based, animated, audio, or video content format. In some implementations, the domain owner can indicate that no content format is preferred over another. As another example, the preferred format field 208 can include a text box that allows the domain owner to type in one or more preferred formats for content provided in association with the specified one or more domains.

The form 200 also includes a keywords field 212 to allow the domain owner to enter keywords for the purpose of targeting content provided in association with the specified one or more domains. In some instances, the multiple keywords can be entered into the keywords field 212 and separated by commas or semi-colons. For example, the domain owner can enter keywords of "sports," "Chicago," "bulls," "bears," "black hawks," "cubs," and "white sox" to indicate that content associated with Chicago sports teams should be provided in association with the specified one or more domains.

Finally, the form 200 includes a submit button 214 that the domain owner can use to submit entries on the form 200.

In other implementations, the form 200 includes more or less fields than shown in the example. For example, the form 200 can include fields for collecting information about the domain owner, such as name, company name, address, telephone number, or e-mail address. As another example, the form 200 can include fields for collecting payment information, such as bank account information.

Referring now to FIG. 3, a request confirmation 300 can be provided to a domain owner who submits a form such as the form 200. For example, the domain owner can submit the form 200 using a web based interface, and the request confirmation 300 can be a web page displayed in response to submission of the form 200. As another example, the request confirmation 300 can take the form of an e-mail sent to the domain owner. As yet another example, the request confirmation 300 can be a physical letter mailed to the domain owner.

In some implementations, the request confirmation 300 can instruct the domain owner to modify data associated with a domain indicated by the domain owner in a specified manner. For example, the request confirmation 300 can include instructions 302 that direct the domain owner to create a CNAME record for the indicated domain. In this example, the instructions 302 can indicate that the CNAME should be set to a specified URL 304. In the example depicted, the request confirmation 300 instructs the domain owner to set the CNAME for the indicated domain to "1234-ABC.example-domain.com." A content provider can then verify that the domain owner who submitted the request is in fact the actual owner of the indicated domain by performing a CNAME lookup for the indicated domain to determine if the CNAME for the indicated domain is the same as the CNAME indicated by the request confirmation 300.

The request confirmation 300 can indicate an identifier and instruct the domain owner to create a CNAME record for the indicated domain that includes the identifier. The content provider can then verify that the domain owner who submitted the request is in fact the actual owner of the indicated domain by performing a CNAME lookup for the indicated domain to determine if the CNAME for the indicated includes the identifier indicated by the request confirmation 300.

In other implementations, the request confirmation 300 can instruct the domain owner to create a sub-domain of the indicated domain that includes the identifier. For example, the request confirmation 300 can instruct the domain owner to create a sub-domain of <identifier>.<domain> where <identifier> is the identifier indicated by the request confirmation 300 and <domain> is the domain indicated by the domain owner. The content provider can then verify that the domain owner who submitted the request is in fact the actual owner of the indicated domain by making an HTTP request for <identifier>.<domain> to determine if the indicated sub-domain exists.

Figure 4:
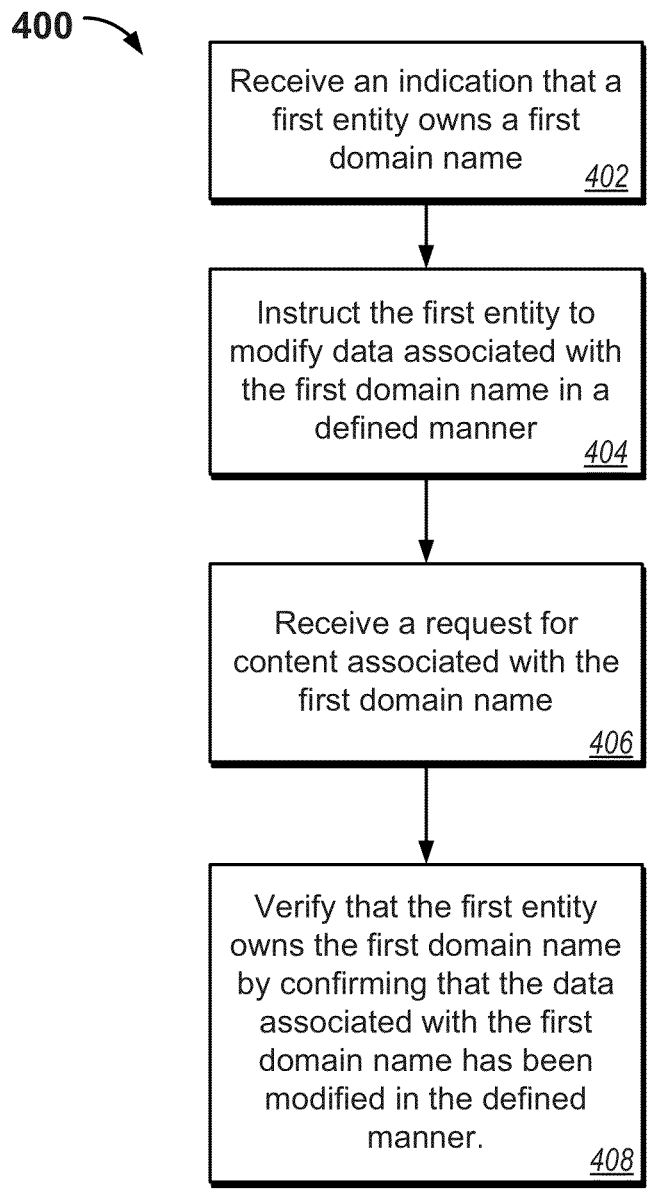
FIG. 4 is a flow diagram illustrating a process for verifying domain ownership.

Referring now to FIG. 4, a process 400 for verifying domain ownership includes receiving an indication that a first entity owns a first domain name (402). For example, referring to FIG. 1, the domain owner 104 may register a new domain name and provide an indication to the advertisement server system 102 that the domain owner 104 owns the new registered domain. For example, the domain owner 104 may register the domain "xampledomain.com" and inform the advertisement server system 102 of the domain name. The indication can be received, for example, along with a request for advertising content to be provided by the advertisement server system 102 in association with the new registered domain.

The first entity then is instructed to modify data associated with the first domain name in a defined manner (404). For example, an identifier can be associated with the first domain name, and the first entity can be instructed to modify a header of a web page associated with the domain name to include the identifier. As another example, the first entity can be instructed to modify page content of a web page associated with domain name to include the identifier. As another example, the first entity can be instructed to modify metadata associated with the first domain name to include the identifier. As yet another example, the first entity can be instructed to create a CNAME record for the first domain name and include the identifier in the CNAME. As yet another example, referring to FIG. 3, the first entity can be instructed to assign the URL 304 as a canonical name for the first domain name.

Subsequently, a request for content associated with the first domain name is received (406). For example, referring to FIG. 1, a user of the end user system 112 makes a request for content associated with the first domain name by entering the first domain name into a navigation field of a web browser. The request is routed through the computer network 106 and eventually reaches the advertisement server system 102. As another example, the request for content associated with the first domain name can be a HTTP request.

The ownership of the first domain name by the first entity is verified by confirming that the data associated with the first domain name has been modified in the defined manner (408). For example, referring to FIG. 1, the advertisement server system 102 can verify that the domain owner 104 owns the first domain by performing a CNAME look up for the first domain to determine if the CNAME associated with the first domain includes an identifier provided to the domain owner 104. As another example, a web page associated with the first domain can be analyzed to determine if a header, page content, or metadata of the web page includes the identifier provided to the first entity.

In some implementations, more or fewer steps can be performed, or one or more steps can be performed in a different order. For example, the step of verifying that the first entity owns the first domain name can be performed before the step of receiving a request for content associated with the first domain name.

Figure 5:
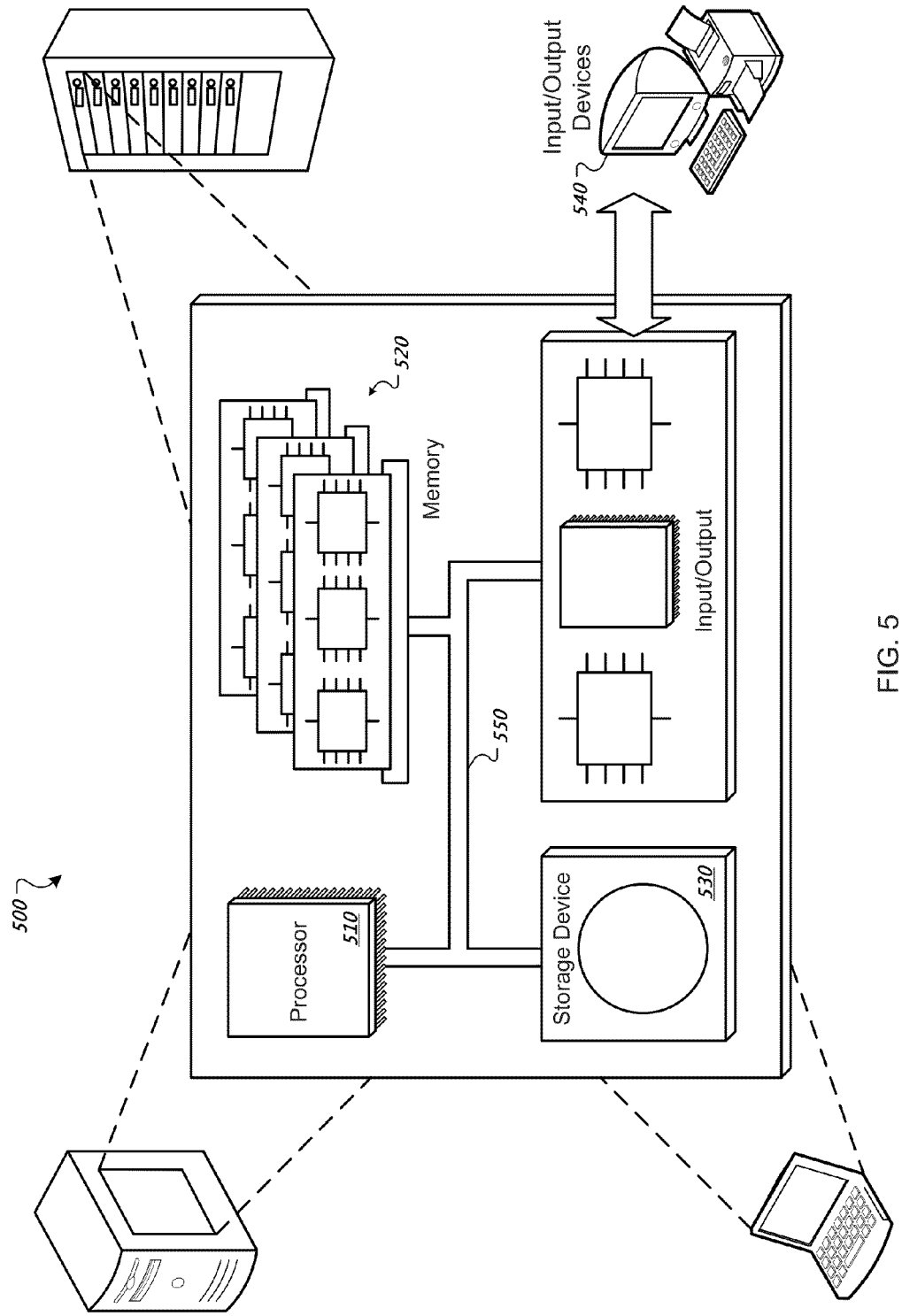
FIG. 5 is a block diagram of a computing system that can be used in connection with computer-implemented methods described in this document.

Referring to FIG. 5, a computer system 500 can be used for the operations described in association with any of the computer-implement methods described previously. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In other implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for verifying domain name ownership, the method comprising:
   receiving an indication that an entity controls content associated with a domain name;
   instructing, using at least one processor, the entity to modify a data record associated with the domain name in a defined manner by including a unique identifier in the data record;
   receiving a request for content associated with the domain name after instructing the entity to modify the data record associated with the domain name;
   verifying, using at least one processor, that the entity controls the content associated with the domain name by confirming that the data record associated with the domain name has been modified in the defined manner; and
   providing the content in response to the request for content upon verifying that the entity controls the content associated with the domain name.

2. The computer-implemented method of claim 1, wherein the content comprises advertising content, and wherein the method further comprises providing payment to the entity for display of the advertising content in a web page that is associated with the domain name, upon verifying that the entity controls the content associated with the domain name and providing the content in response to the request for content.

3. The computer-implemented method of claim 1, wherein the entity is a domain owner.

4. The computer-implemented method of claim 1, wherein the provided content is advertising content.

5. The computer-implemented method of claim 1, wherein verifying that the entity controls the content associated with the domain name comprises confirming that the unique identifier is included in the data record associated with the domain name.

6. The computer-implemented method of claim 1, wherein instructing the entity to modify the data record associated with the domain name in the defined manner by including the unique identifier in the data record comprises instructing the entity to include the unique identifier in a CNAME associated with the domain name.

7. The computer-implemented method of claim 1, wherein instructing the entity to modify the data record associated with the domain name in the defined manner by including the unique identifier in the data record comprises instructing the entity to include an address including the unique identifier in a CNAME associated with the domain name.

8. A non-transitory computer storage medium encoded with a computer program, the program comprising instructions that when executed by a data processing apparatus cause the data processing apparatus to perform operations comprising:
   receiving an indication that an entity controls content associated with a domain name;
   instructing, using at least one processor, the entity to modify a data record associated with the domain name in a defined manner by including a unique identifier in the data record;
   receiving a request for content associated with the domain name after instructing the entity to modify the data record associated with the domain name;
   verifying, using at least one processor, that the entity controls the content associated with the domain name by confirming that the data record associated with the domain name has been modified in the defined manner; and
   providing the content in response to the request for content upon verifying that the entity controls the content associated with the domain name.

9. The non-transitory computer storage medium of claim 8, wherein the content comprises advertising content, and wherein the operations further comprise:
   providing payment to the entity for display of the advertising content in a web page that is associated with the domain name, upon verifying that the entity controls the content associated with the domain name and providing the content in response to the request for content.

10. The non-transitory computer storage medium of claim 8, wherein the provided content is advertising content.

11. The non-transitory computer storage medium of claim 8, wherein verifying comprises:
   confirming that the unique identifier is included in the data record associated with the domain name.

12. The non-transitory computer storage medium of claim 8, wherein instructing the entity to modify the data record associated with the domain name in the defined manner by including the unique identifier in the data record comprises:
    instructing the entity to include the unique identifier in a CNAME associated with the domain name.

13. A system comprising:
    a receiver that receives an indication that an entity controls content associated with a domain name and later receives a request for content associated with the domain name; and
    at least one processor that instructs the entity that controls the content associated with the domain name to modify a data record associated with the domain name in a defined manner by including a unique identifier in the data record, before the receiver receives the request for content associated with the domain name, verifies that the entity controls the content associated with the domain name by confirming that the data record associated with the domain name has been modified in the defined manner, and provides the content in response to the request for content upon verifying that the entity controls the content associated with the domain name.

\* \* \* \* \*